Feb. 20, 1934.　　　　　C. HELLE　　　　　1,948,379
APPARATUS AND METHOD FOR APPLYING STRIPS OF SOLDER TO SHEET METAL
Filed June 12, 1931
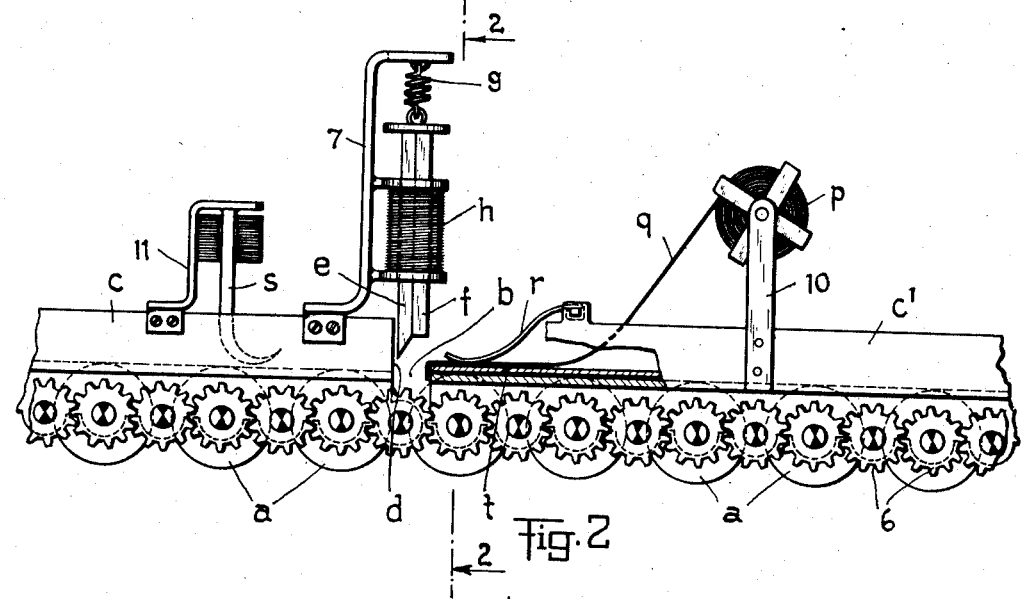
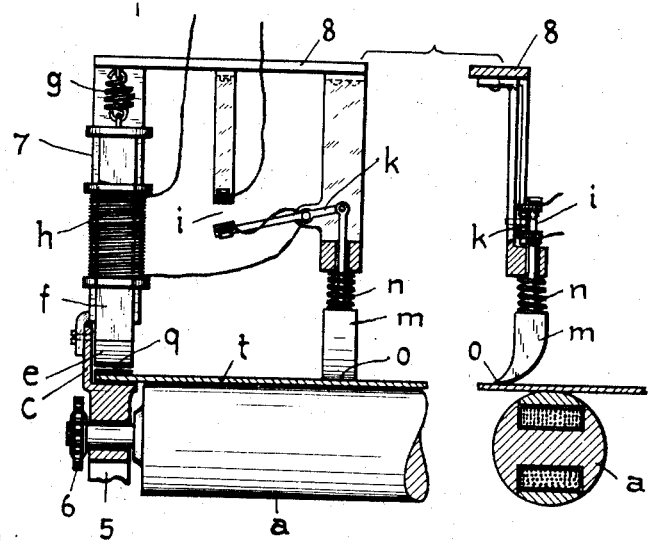
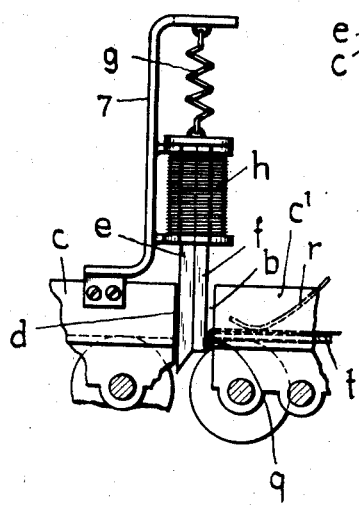
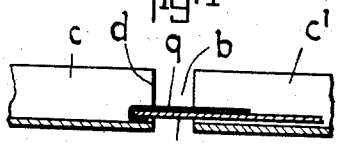
Inventor,
Carl Helle,
by R.W. Dahn,
Attorney.

Patented Feb. 20, 1934

1,948,379

UNITED STATES PATENT OFFICE 1,948,379

APPARATUS AND METHOD FOR APPLYING STRIPS OF SOLDER TO SHEET METAL

Carl Helle, Brunswick, Germany, assignor to Elektrische Löt- und Schweiss-Gesellschaft mit beschrankter Haftung, Brunswick, Germany Application June 12, 1931, Serial No. 543,949, and in Germany August 19, 1930

14 Claims. (Cl. 153—1)

My invention relates to improvements in apparatus and method for applying strips of solder to sheet metal, and more particularly in apparatus in which the strip of solder is applied to the blank being fed to a soldering device in which it is fixed to the blank. Blanks of this type are employed in making sheet metal cans. The object of the improvements is to provide an apparatus of this type in which the strip is fed and applied to the blank in a regular way so that it is not laid in folds. With this object in view my invention consists in providing means for bending the front end of the strip around the front edge of the blank, so that the blank itself takes the strip from a roll thereof.

For the purpose of explaining the invention an example embodying the same has been shown in the accompanying drawing in which the same reference characters have been used in all the views to indicate corresponding parts. In said drawing, Fig. 1 is an elevation partly in section showing the apparatus, Fig. 2 is a sectional plan view taken on the line 2—2 of Fig. 1.

Fig. 3 is a detail view showing the device for cutting the strip of solder in a position different from that shown in Fig. 1, and Fig. 4 is a detail sectional view showing the front end of the blank and the front end of the strip of solder hooked around the same.

In the example shown in the figures the apparatus comprises two frame members 5 providing a support for a series of magnetic feed rollers $a$ connected with each other by interengaging spur wheels 6. Secured to or made integral with each of the frame members 5 are two guide members $c$, $c^1$ of angular cross-section, which guide members $c$, $c^1$ are spaced from each other at their adjacent ends as is shown in Figs. 1, 3 and 4 at $b$. To one of the guide members $c$ a bracket 7 is secured which provides a support for a cutting device comprising a blade $e$ cooperating with the end of the guide member $c$ for cutting the strip $q$ of solder. The said blade $e$ is secured to a plunger $f$ and the said parts are suspended from the bracket 7 by means of a coiled spring $g$, and they provide a core of a solenoid $h$ mounted on the bracket 7. The circuit of the said solenoid includes a switch $i$ mounted on a laterally directed arm 8 of the bracket 7 and comprising a rockable switch arm $k$ connected with a feeler $m$ normally pressed by a coiled spring $n$ downwardly and on the surface of the blank $t$. The said feeler is located laterally of the blade $e$, and it is formed with a cam face $o$ directed upwardly from the transverse plane of the blade $e$ and towards the incoming blank $t$.

To one of the guide members $c^1$ an arm 10 is fixed, which provides a support for a reel $p$ having a strip of solder $q$ wound thereon. Near its end the said guide member $c^1$ has a leaf spring $r$ secured thereto which is adapted to press the strip $q$ of solder onto the blank $t$. To the guide member $c$ located in alignment with the guide member $c^1$ carrying the reel $p$ an arm 11 is secured on which the soldering iron $s$ is mounted, the said soldering iron being heated by suitable means.

The operation of the apparatus is as follows: By means of the rollers $a$ the sheet metal $t$ is fed towards the space $b$, and as it arrives near the said space the soldering strip $q$ is bent around the front end thereof as is shown in Fig. 1. Thus, when the blank is further advanced the strip of solder $q$ is safely carried along by reason of the bent front end thereof, and it is smoothly placed on the blank by the spring $r$. When the blank $t$ engages the cam face $o$ of the feeler $m$, the said feeler is lifted and it opens the switch $i$ as is shown in Fig. 2. Thereby the current energizing the coil $h$ is interrupted, and the core $e$, $f$ is pulled upwardly by the spring $g$. Now the blank passes below the blade $e$, which however is inoperative. When the rear edge of the blank is in position below the blade $e$, it releases the feeler $m$, so that the switch arm $k$ is rocked into position for closing the switch $i$. Thereby the coil $h$ is again energized and the blade $e$ is thrown downwardly for cutting the strip $q$ at the rear of the blank. Simultaneously the plunger $f$ strikes on the front end of the strip $q$ projecting into the space $b$ and it bends the same downwardly and into the position shown in Fig. 3. When a new blank is advanced it engages the downwardly directed end of the strip $q$ and carries the same along in the manner described above, the downwardly directed front end of the strip being bent rearwardly and into the position shown in Fig. 4 by the rear end of the guide member $c$.

After a blank has passed through the cutting device the strip $q$ is fixed thereto by means of the soldering iron $s$.

I claim:

1. An apparatus for applying a strip of solder to sheet metal, comprising means for feeding a sheet and a strip superposed thereon adjacent one side edge of the sheet with the forward portion of the strip projecting ahead of the front end of the sheet, and means for bending the front end of the strip of solder on the front edge of the sheet.

2. An apparatus for applying a strip of solder to sheet metal, comprising means for feeding the sheet and the strip superposed thereon adjacent one side edge of the sheet with the forward portion of the strip projecting ahead of the front end of the sheet, and means for bending the front end of the strip of solder on the front edge of the sheet and around the same.

3. An apparatus for applying a strip of solder to sheet metal, comprising means for feeding the sheet, means for supplying a strip of solder to said sheet, means controlled by said sheet for cutting the strip, and means for bending the front end of the strip.

4. An apparatus for applying a strip of solder to sheet metal, comprising means for feeding the sheet metal, means for supplying a strip of solder thereto, a plunger comprising a cutting member and a bending member adapted to cut the strip of solder and to bend the same into position for engagement by the front edge of the sheet metal being fed, and means for operating said plunger.

5. An apparatus for applying a strip of solder to sheet metal, comprising means for feeding the sheet metal, means for supplying a strip of solder thereto, a plunger comprising a cutting member and a bending member adapted to cut the strip of solder and to bend the same into position for engagement by the front edge of the sheet metal being fed, means controlling the operation of the said plunger, and a feeler adapted to bear on the sheet metal being fed and to be dropped from the rear edge thereof and operatively connected with said controlling means.

6. An apparatus for applying a strip of solder to sheet metal, comprising means for feeding the sheet metal, means for supplying a strip of solder thereto, a plunger comprising a cutting member and a bending member, adapted to cut the strip of solder and to bend the same into position for engagement by the sheet metal being fed, means controlling the operation of the said plunger, and a feeler adapted to bear on the sheet metal being fed and to be dropped from the rear edge thereof and operatively connected with said controlling means, said feeler being formed with a cam face permitting the same to be lifted by the leading edge of the sheet metal being fed.

7. An apparatus for applying a strip of solder to sheet metal, comprising means for feeding the sheet metal, means for supplying a strip of solder thereto, a plunger comprising a cutting member and a bending member adapted to cut the strip of solder and to bend the same into position for engagement by the sheet metal being fed, a solenoid and a spring cooperating to control the movement of said plunger, and means controlled by the sheet metal being fed controlling the supply of electric current to said solenoid.

8. An apparatus for applying a strip of solder to sheet metal comprising means for feeding in the same direction a sheet of metal and a strip of solder lying against a face of the sheet with the end of the strip extending forward beyond the front end of the sheet, and means for bending a forwardly projecting portion of the strip about the front edge of the sheet.

9. An apparatus for applying a strip of solder to sheet metal, blanks comprising means for feeding in the same direction a series of blanks and a strip of solder lying thereon, means for cutting off the strip with a portion thereof extending beyond the front edge of the following blank, and means for simultaneously bending the strip about the forward end of the following blank.

10. An apparatus for applying a strip of solder to sheet metal comprising means for feeding in the same direction a sheet of metal and a strip of solder lying against a face of the sheet parallel to a side edge of the sheet with the forward end of the strip projecting beyond the sheet of metal, and means for bending the strip about the front edge of the sheet.

11. A method of preparing blanks for tin cans or the like comprising laying a strip of solder close to an edge of a blank, feeding the strip and a succession of spaced blanks forward, cutting the strip between successively fed blanks so as to leave a portion of the strip extending beyond the front end of the next blank, and bending the end of the strip over the end of the blank next in series to insure movement of the strip with the blank.

12. A method of preparing blanks for tin cans or the like comprising laying a strip of solder close to an edge of a blank, feeding the strip and a succession of blanks forward, cutting the strip between successively fed blanks, so as to leave a portion of the strip extending beyond the front end of the next blank, bending the end of the strip over the end of the blank next in series to insure movement of the strip with the blank, and welding the solder to the blank.

13. An apparatus for applying solder to sheet metal blanks comprising means for feeding a series of blanks, means for placing a strip of solder on the successive blanks, means for cutting off the strip between blanks so as to leave a portion of the strip extending beyond the front end of the next blank, and means for bending the end of the strip of solder down over the end of the next blank of the series.

14. An apparatus for applying solder to sheet metal blanks comprising means for feeding a series of blanks, means for placing a strip of solder on the successive blanks, means for cutting off the strip between blanks so as to leave a portion of the strip extending beyond the front end of the next blank, means for bending the end of the strip of solder down over the end of the next blank of the series, and means for welding each cut-off portion of solder to the corresponding blank.

CARL HELLE.